United States Patent
Fernihough

(10) Patent No.: US 9,784,861 B2
(45) Date of Patent: Oct. 10, 2017

(54) HYDROPHONE

(71) Applicant: PGS Geophysical AS, Oslo (NO)

(72) Inventor: Robert Alexis Peregrin Fernihough, Jarrell, TX (US)

(73) Assignee: PGS Geophysical AS, Oslo (NO)

( * ) Notice: Subject to any disclaimer, the term of this patent is extended or adjusted under 35 U.S.C. 154(b) by 182 days.

(21) Appl. No.: 14/569,066

(22) Filed: Dec. 12, 2014

(65) Prior Publication Data

US 2015/0219776 A1    Aug. 6, 2015

Related U.S. Application Data

(60) Provisional application No. 61/934,357, filed on Jan. 31, 2014.

(51) Int. Cl.
| | | |
|---|---|---|
| *G01V 1/40* | (2006.01) | |
| *G01V 1/18* | (2006.01) | |
| *G01H 9/00* | (2006.01) | |
| G01V 1/38 | (2006.01) | |

(52) U.S. Cl.
CPC .............. *G01V 1/186* (2013.01); *G01H 9/004* (2013.01); *G01V 1/188* (2013.01); *G01V 1/38* (2013.01); *G01V 1/40* (2013.01)

(58) Field of Classification Search
CPC .......... G01V 1/04; G01V 1/143; G01V 1/155; G01V 1/38; G01V 1/02
USPC ......................................................... 364/149
See application file for complete search history.

(56) References Cited

U.S. PATENT DOCUMENTS

| | | | | | |
|---|---|---|---|---|---|
| 3,831,137 | A | * | 8/1974 | Cuomo ................... | G01V 1/186 250/227.11 |
| 4,160,229 | A | * | 7/1979 | McGough .............. | G01V 1/201 367/154 |
| 4,162,397 | A | * | 7/1979 | Bucaro ................. | H04R 23/008 250/227.14 |
| 4,363,533 | A | * | 12/1982 | Stowe ................... | G02F 1/0134 367/141 |
| 4,568,408 | A | * | 2/1986 | Schmadel .............. | G01H 9/004 156/173 |

(Continued)

FOREIGN PATENT DOCUMENTS

| | | | |
|---|---|---|---|
| FR | DE 3730518 | A1 * | 12/2013 |
| GB | 2386183 | | 9/2003 |
| IE | 3730518 | | 12/2013 |

OTHER PUBLICATIONS

Kuraray Septon, "What is Septon?" retrieved Dec. 8, 2014, 2 pages.

(Continued)

*Primary Examiner* — Luke Ratcliffe
*Assistant Examiner* — Amie M N'Dure

(57) ABSTRACT

This disclosure is related to hydrophones, for example hydrophones that may be used in marine seismic surveying, permanent reservoir monitoring, downhole acoustic monitoring in a wellbore, and/or various other applications. Some embodiments of a hydrophone according to this disclosure are constructed such that a longitudinal stiffness of the hydrophone is greater than a circumferential stiffness of the hydrophone. In some embodiments, however, the longitudinal stiffness may be somewhat less than the circumferential stiffness. For example, the longitudinal stiffness may be greater than one half the circumferential stiffness in some cases.

22 Claims, 9 Drawing Sheets

(56) References Cited

U.S. PATENT DOCUMENTS

| | | | |
|---|---|---|---|
| 5,285,424 A | 2/1994 | Meyer | |
| 5,363,342 A * | 11/1994 | Layton | G01H 9/004 356/477 |
| 5,394,377 A * | 2/1995 | vonBieren | G01H 9/004 250/227.14 |
| 5,625,724 A * | 4/1997 | Frederick | G01V 1/186 250/227.11 |
| 6,288,975 B1 * | 9/2001 | Frederick | G01H 9/004 181/102 |
| 6,314,056 B1 | 11/2001 | Bunn et al. | |
| 6,443,226 B1 * | 9/2002 | Diener | E21B 47/011 166/241.6 |
| 6,549,488 B2 | 4/2003 | Maas et al. | |
| 6,882,595 B2 | 4/2005 | Woo | |
| 7,082,079 B2 | 7/2006 | Woo | |
| 8,069,913 B2 * | 12/2011 | Coste | G01V 1/46 166/250.11 |
| 9,069,099 B2 * | 6/2015 | Auzerais | G01V 1/40 |
| 9,085,962 B2 * | 7/2015 | Richards | E21B 47/011 |
| 2004/0184352 A1 * | 9/2004 | Woo | H04R 1/44 367/149 |
| 2004/0202401 A1 * | 10/2004 | Berg | G01V 11/00 385/12 |
| 2005/0195687 A1 * | 9/2005 | Woo | H04R 1/44 367/149 |
| 2007/0189658 A1 * | 8/2007 | Maas | G01P 1/023 385/12 |
| 2009/0242205 A1 * | 10/2009 | Coste | G01V 1/52 166/308.1 |
| 2011/0188348 A1 * | 8/2011 | Auzerais | G01V 1/40 367/86 |

OTHER PUBLICATIONS

O'Neill, Technical Report No. 108—Hydrophone Development at Hudson Laboratories, Defense Documentation Center for Scientific and Techinical Information, Unclassified AD 437903, Sep. 24, 1963, 79 pages.

O'Neill, "Pressure-Balanced High-Pressure Hydrophone," Letters to the Editor, received Jun. 29, 1962, pp. 1661-1662.

SABIC Innovative Plastics, Ultem Resin 2300, Americas: Commercial, source GMD, last update Apr. 14, 2003, 3 pages.

3M™ Scotchcast™ Electrical Resin 8 (16 lb unit 1 gallon can): Electrical OEM Materials: 3M US, retrieved Dec. 8, 2014, 2 pages.

Item # Accutether® 80 μm Bend Insensitive Optical Fiber, OFS A Furukawa Company—Your Optical Fiber Solutions Parnter, retrieved Dec. 8, 2014, 2 pages.

Item # Accutether® 125 μm Bend Insensitive Optical Fiber, OFS A Furukawa Company—Your Optical Fiber Solutions Partners, retrieved Dec. 8, 2014, 2 pages.

MERECO Product Information—High Technology Materials, MERECO XLN-540—Submersible Electronic Potting, Form 1105 Rev. 0, retrieved Dec. 8, 2014, 4 pages.

SABIC Innovative Plastics, ULTEM™ Resin 1000, Americas: Commercial, retrieved Dec. 8, 2014, 1 page.

Extended European Search Report in Patent Application No. 15152820.5 mailed Feb. 4, 2016, 11 pages.

* cited by examiner

HYDROPHONE

CROSS-REFERENCE TO RELATED APPLICATIONS

This application claims the benefit of Provisional Patent Application No. 61/934,357, filed Jan. 31, 2014, which is hereby incorporated by reference in its entirety.

BACKGROUND

In the oil and gas exploration industry, marine geophysical surveying is commonly used in the search for hydrocarbon-bearing subterranean formations. Marine geophysical surveying techniques may yield knowledge of the subsurface structure of the Earth, which is useful for finding and extracting hydrocarbon deposits such as oil and natural gas. Seismic surveying is one of the well-known techniques of marine geophysical surveying.

In some instances of seismic surveying conducted in a marine environment (which may include saltwater, freshwater, and/or brackish water environments), one or more seismic sources are typically configured to be submerged and towed by a vessel. The vessel is typically also configured to tow one or more laterally spaced streamers through the water. In some instances, in addition to or in lieu of streamers, sensors may be located at or near the seafloor, either on ocean bottom cables or nodes. At selected times, control equipment may cause the one or more seismic sources to actuate. Seismic signals may then be received by sensors such as hydrophones disposed along the streamers. Data collected during such a seismic survey may be analyzed to assist identification of hydrocarbon-bearing geological structures, and thus determine where deposits of oil and natural gas may be located.

In some cases, hydrophones may also be used in seafloor reservoir monitoring (e.g., permanent reservoir monitoring or PRM) applications. For example, hydrophones may be disposed on the seafloor to record data while seismic sources (e.g., seismic sources at or near the water surface) are actuated.

Figure 1A:
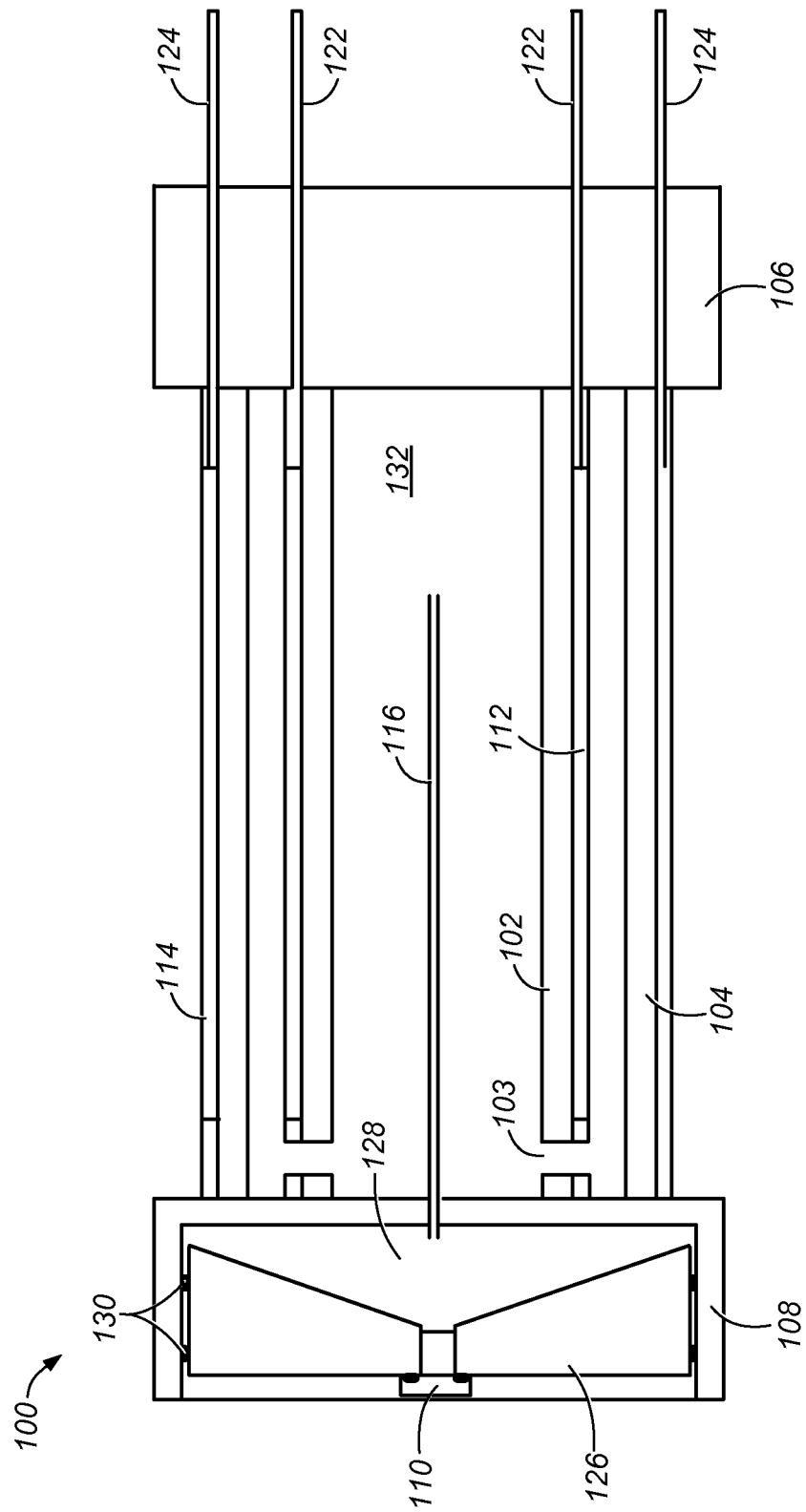
FIGS. 1A-1B illustrate embodiments of hydrophones according to this disclosure.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware—for example, circuits, memory storing program instructions executable to implement the operation, etc.—mechanical devices, or other types of structure. Reciting that a device/unit/circuit/component is "configured to," "usable to," or "operable to" perform one or more tasks is expressly intended not to invoke 35 U.S.C. §112(f), for that device/unit/circuit/component.

In some embodiments, various items of information relating to seismic surveying, such as data collected by hydrophones, may be embodied in a geophysical data product. A "geophysical data product" may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, CDs, DVDs, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored in the geophysical data product. The geophysical data product may be produced offshore (e.g., by equipment on a vessel) or onshore (e.g., at a facility on land) either within the United States or in another country. If the geophysical data product is produced offshore or in another country, it may be imported onshore to a facility in the United States. Once onshore in the United States, geophysical analysis may be performed on the geophysical data product.

In some instances of a typical marine geophysical survey, one or more seismic sources may be used to generate seismic energy. Various types of seismic sources may be used for this purpose. For example (and without limitation), air guns, flexural disc projectors, and/or marine vibrators may be used in some cases. The seismic energy may travel downward through the water and through the formations underlying the water bottom. Impedance boundaries within the subsea formations may reflect (at least in part) the seismic energy that travels through such formations. The reflected seismic energy may then travel upwards. Seismic sensors (e.g., hydrophones, geophones, accelerometers, etc.) located in the vicinity of the formation may capture such reflected seismic energy. These seismic sensors may convert the captured seismic energy into signals, such as optical or electrical signals. The electrical or optical signals may then be interpreted to provide information as to the composition and/or structure of the various subsurface formations under the water bottom. Such information may be used, for example, to determine the possibility that such formations may contain mineral deposits including hydrocarbons.

DETAILED DESCRIPTION

This disclosure is directed generally to the field of hydrophones. The term "hydrophone" is used herein according to its ordinary meaning in the art, which includes a seismic sensor that can detect sound waves (for example, in the form of variations in acoustic pressure) in a liquid such as water. Hydrophones may be useful in various aspects of hydrocarbon prospecting and acquisition. For example, hydrophones may be used in marine geophysical surveying, seafloor reservoir monitoring (commonly known as permanent reservoir monitoring or PRM), and for downhole acoustic monitoring in a wellbore. According to some embodiments of this disclosure, a fiber optic hydrophone is described that is relatively insensitive to hydrostatic pressure while presenting useful sensitivity to acoustic pressure.

Various embodiments of this disclosure employ novel features that may enable higher acoustic pressure sensitivity per unit length of optical fiber than other known hydrophones. In some embodiments, hydrophones according to this disclosure may be pressure-balanced, which is a term generally used to mean that the static pressure inside the hydrophone (e.g., in the internal volume of the hydrophone) is the same (or substantially the same) as the static pressure immediately outside the hydrophone. In some embodiments, a pressure-balanced hydrophone may have a pressure inside that is identical to the pressure outside (e.g., to within the limits of measurement). In some embodiments, however, the pressure may be somewhat different (e.g., the pressure may be greater outside). As long as the pressure differential is low enough that the hydrophone does not rupture or collapse (e.g., within 500 psi), then the hydrophone may be useable.

Turning now to FIG. 1A, a cross-sectional view of one embodiment of a hydrophone according to this disclosure is shown. Hydrophone 100 includes end caps 106 and 108, which are in some embodiments made of a rigid material (e.g., steel, titanium, suitable resins such as a glass-filled polyetherimide like Ultem™ 2300, etc.). End caps 106 and 108 may be attached to the ends of inner mandrel 102 and outer mandrel 104, which are shown as two concentric cylinders arranged along a common longitudinal axis in this embodiment. Inner mandrel 102 may be designed to be comparatively stiff relative to outer mandrel 104 (or at least not much less stiff) in such a way as to make hydrophone 100 relatively stiff in the longitudinal direction or longitudinal dimension. For example, as described in more detail below, it may be advantageous for inner mandrel 102 to be at least half as stiff as outer mandrel 104. As described below, in various embodiments, inner mandrel 102 may be anywhere from half as stiff to (in the limit) infinitely more stiff than outer mandrel 104. Inner mandrel 102 (and in some instances inner mandrel 102 together with end caps 106 and 108) and corresponding structural equivalents may be referred to as a "means for establishing a longitudinal stiffness." Outer mandrel 104 and its structural equivalents may be referred to as a "means for establishing a circumferential stiffness."

Reference optical fiber 112 and sensing optical fiber 114 may respectively be wound around inner mandrel 102 and outer mandrel 104. Extensions 122 and 124 of these optical fibers may respectively then pass through small, sealed holes in either one (or in some embodiments each) of the end caps to facilitate optical connection of hydrophone 100. Some embodiments may use, for example, Accutether™ optical fiber for one or more of the optical fiber elements. Reference optical fiber 112 and sensing optical fiber 114 may be used as the two optical paths of an interferometer (e.g., a Michelson interferometer, as described in more detail below, or various other types of interferometer). Reference optical fiber 112 and its structural equivalents may be referred to as a "reference means for measuring a reference signal." Sensing optical fiber 114 and its structural equivalents may be referred to as a "sensing means for measuring a variable signal." Outer mandrel 104 may in some embodiments be encapsulated in a conformal jacket of epoxy resin (e.g., an encapsulant) or other suitable material to protect sensing optical fiber 114 from the environment. In some embodiments, an epoxy with good longevity properties in seawater, such as Mereco™ CN-874 or 3M™ Scotchcast™ Electrical Resin 8, may be advantageously used for this purpose.

As described below, some embodiments of hydrophones according to this disclosure may work on the principle of converting an applied acoustic pressure to a length change in sensing optical fiber 114 coupled to the outer mandrel.

Internal volume 132 of hydrophone 100 may be filled with a fill fluid of useful bulk modulus (e.g., a suitable oil, such as a high-viscosity oil that has comparatively low bulk modulus). For example, typical fill fluids used for this purpose may have bulk moduli in the range of 1-2 GPa. A particular fill fluid that may be used has a bulk modulus of 1.8 GPa. Inner mandrel 102 may include at least one hole 103 or other aperture to allow the fill fluid to pass between the internal space of inner mandrel 102 and the concentric space that exists between the inner mandrel 102 and outer mandrel 104.

In some embodiments, one or both of the end caps may include a fill fluid reservoir. As shown in this embodiment, end cap 108 includes fill fluid reservoir 128 and piston 126, which may be used to associate the exterior pressure with the pressure of fill fluid reservoir 128, while preventing any association of the fill fluid itself with the external medium (e.g., seawater). Piston 126 may be sealed via one or more O-rings 130 in some embodiments. Piston 126 may also include seal screw 110 which may be used while filling hydrophone 100 (as described in more detail below). An additional seal screw (not shown) may also be employed between fill fluid reservoir 128 and internal volume 132 of hydrophone 100 and used when filling hydrophone 100 with fill fluid.

In some embodiments, end cap 108 may also include capillary tube 116 (also called a Eustachian tube) that provides a very small but open path between the internal volume of hydrophone 100 and the internal volume of fill fluid reservoir 128. Functionally, this may allow pressure equalization over a finite time period, such as seconds or minutes. As piston 126 may be sealed to the internal bore of end cap 108, any increase in exterior pressure may be transferred to the fill fluid in contact with the inside surface of piston 126. As such, piston 126 may move in response to an increase in pressure, causing fill fluid to be passed through capillary tube 116 until the internal pressure (e.g., the pressure in internal volume 132 of hydrophone 100) is equal with the exterior pressure. As such, from the perspective of hydrostatic pressure, this design may be considered pressure-balanced and may therefore operate at any desired depth without danger of being crushed.

Figure 1B:
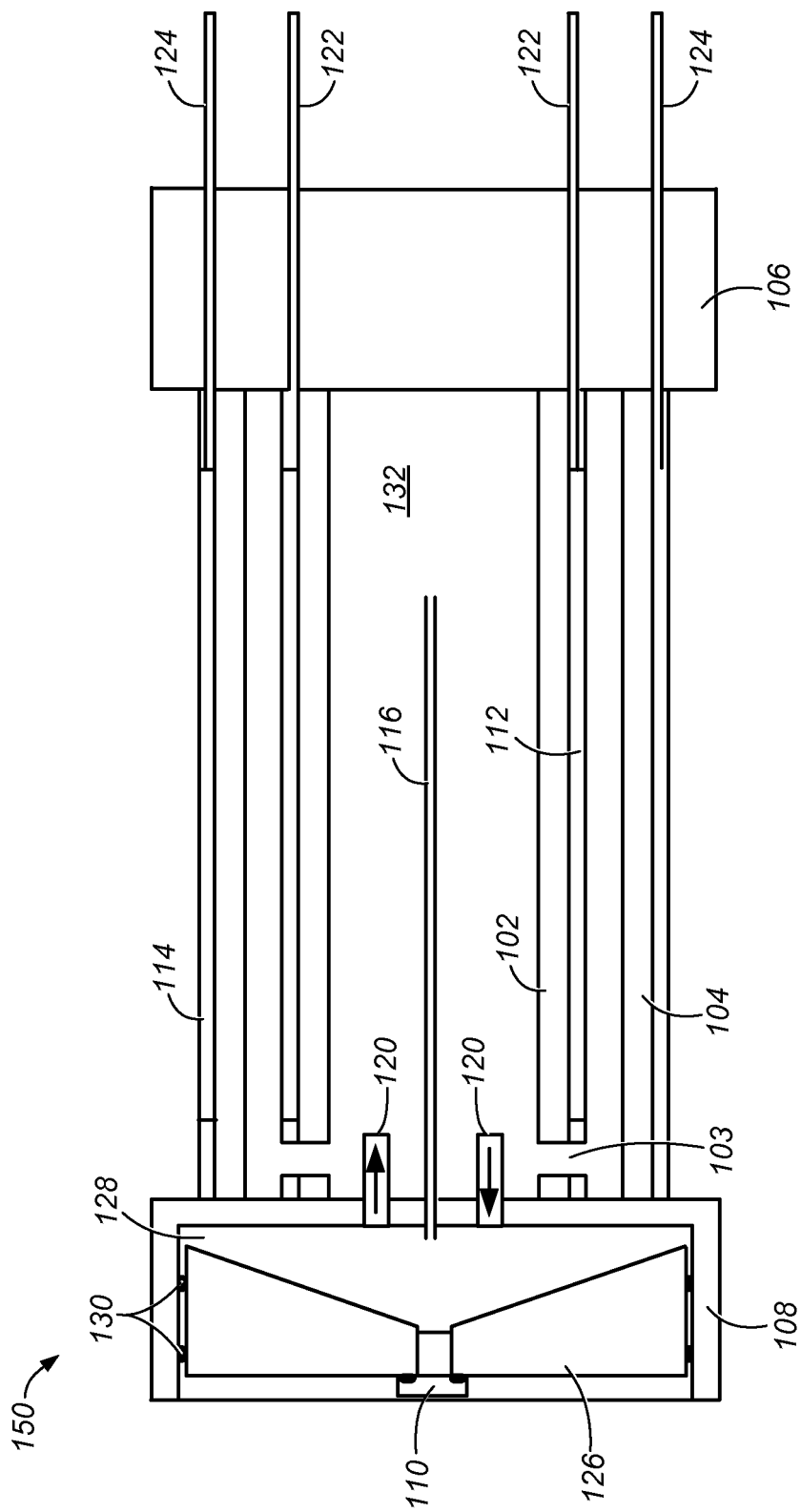

In other arrangements, such as shown in FIG. 1B, one or more relief valves may be included in addition to (or in place of) capillary tube 116. In such embodiments, a small leakage path presented by imperfect sealing in such relief valves may assume the same function as capillary tube 116.

Given that the fill fluid may have high viscosity, and that capillary tube 116 may have a very small bore, the maximum rate at which fluid can pass may be very low indeed (e.g., the rate may be made as low as desired by selecting appropriate fill fluid viscosity and capillary tube diameter and length, as discussed below). This may result in a design that will allow changes in static pressure to equalize over time, but will not allow changes in dynamic acoustic pressure above a selected design frequency to equalize. That is, the flow rate through capillary tube 116 may be low enough that low-frequency pressure changes (e.g., descending into the ocean) are able to pass through capillary tube 116. But higher-frequency changes (e.g., 1 Hz or more) may not have time to equalize via capillary tube 116.

As hydrophone 100 is taken from the sea surface to some finite ocean depth (for example, 100 meters or greater), the hydrostatic pressure around it typically increases. The effect of this exterior pressure on the hydrophone is generally to cause it to volumetrically compress. The volumetric compressibility of the hydrophone may include two major components: the volumetric compressibility of its cylindrical shell structure, and the volumetric compressibility of the fill fluid, which may depend upon the bulk modulus of the fill fluid.

The volumetric load presented by the exterior pressure is thus essentially supported and shared between these two components. (In this sense, hydrophone 100 could be considered as a volumetric composite.) As piston 126 is free to move in response to the exterior pressure, the pressure of fill fluid reservoir 128 is typically equal to the exterior hydrostatic pressure, and so some embodiments may be referred to as pressure-balanced hydrophones.

As the exterior pressure increases, hoop stresses (also referred to as circumferential stresses) are set up in outer mandrel 104, and hence also within sensing optical fiber 114. Simultaneously, longitudinal stresses are set up in the walls of the inner mandrel 102 and outer mandrel 104 in response to the hydrostatic pressure acting on end caps 106 and 108. The compressive moduli and Poisson's ratio of the various materials in hydrophone 100 may determine the resulting compressive directional strains that occur, which in turn may define some reduction in volume. As the volume of hydrophone 100 reduces, the internal pressure of the fill fluid increases. As such, the exterior pressure may be held in equilibrium by an aggregate of the aforementioned structural stresses and the internal pressure of the fill fluid. As some of the exterior pressure is being supported by the structural stresses, the internal pressure may be somewhat lower than the exterior pressure. In some embodiments, it may be useful to choose a fill fluid with a relatively large bulk modulus that makes it somewhat stiffer than outer mandrel 104 in response to circumferential stresses. For example, based upon the bulk modulus of the fill fluid and the modulus of elasticity of outer mandrel 104, the fill fluid may be between 2 and 10 times as stiff, between 2 and 20 times as stiff, between 2 and 50 times as stiff, between 2 and 100 times as stiff, etc., when compared to the circumferential stiffness of outer mandrel 104. For example, as described in more detail below, a relatively stiff fill fluid may be useful for allowing a hydrophone according to this disclosure to be pressure-balanced.

Accordingly, the volumetric load presented to the hydrophone by an exterior acoustic pressure may be shared between structural stresses and a change in internal pressure due to volumetric compression. As one of the structural stresses is a circumferential hoop stress in outer mandrel 104, this stress may be applied in part to sensing optical fiber 114 that is wound around its exterior surface. As such, this stress may cause a strain in outer mandrel 104, which may manifest as a small change in the length of sensing optical fiber 114. Accordingly, this optical fiber can serve as the sensing leg of an optical interferometric hydrophone.

When an acoustic pressure acts on hydrophone 100, the applied load may be almost entirely supported by the fill fluid that fills internal volume 132. In response to this pressure, the volume of this fill fluid may reduce in accordance with its bulk modulus. As end caps 106 and 108 are typically separated by inner mandrel 102, which may be very longitudinally rigid, this reduction in fill fluid volume may generally occur only (or primarily) through a reduction of the circumference of outer mandrel 104. As such, the change in the sensing optical fiber's length/unit pressure may be increased or maximized. That is, for a given amount of volume change, the amount of circumferential change (which is measurable) may be increased by decreasing the amount of longitudinal change (which is typically not measurable).

As mentioned previously, inner mandrel 102 also has reference optical fiber 112 wound on its exterior surface. As this mandrel may be designed to be stiffer than outer mandrel 104 and may have at least one hole 103 or other aperture that helps to maintain the pressure around it approximately substantially equal at all frequencies of interest, it will typically not strain in the same way as the outer mandrel 104 does in response to acoustic pressure. As such, the length of reference optical fiber 112 can be considered to be essentially constant and can therefore serve as the reference path in an optical interferometer. (The basics of an interferometer are described below.)

Turning now to FIG. 1B, an alternative embodiment of a hydrophone according to this disclosure is shown. Hydrophone 150 is generally similar to hydrophone 100, but with the addition of pressure relief valves. (References to hydrophone 100 or hydrophone 150 throughout this disclosure should be understood to refer to either, except in situations in which the context indicates otherwise.) These pressure relief valves may be used to protect the hydrophone's structure from very large and fast pressure changes associated with either pressure testing or deployment by allowing the capillary tube to be bypassed as necessary.

As shown, end cap 108 may incorporate one or more relief valves 120, which may in some embodiments have an activation pressure that is well above the peak pressure of any acoustic pressure signal of interest, but well below the differential pressure at which structural damage would occur to the assembly as described. These conditions may allow relief valves 120 to prevent damage to hydrophone 150 from occurring, while not affecting the measured signal. This may be useful in instances where the hydrostatic pressure changes rapidly (e.g., a quick descent to a large ocean depth, etc.).

If the hydrostatic pressure increases to such a level that it exceeds the internal pressure of hydrophone 150 by more than the activation pressure of the inward facing one of relief valves 120, then that valve may open. On activation, the hydrostatic pressure may push piston 126 outward (typically by a relatively small amount) until sufficient fill fluid has passed through the open valve to balance the internal pressure of hydrophone 150 with the pressure of fill fluid reservoir 128 (which is generally equal to the exterior hydrostatic pressure).

Once the internal and exterior pressures are equal (or equal to within the activation pressure of the inward facing one of relief valves 120), then the valve may close, and the structural stresses in the hydrophone may all be zero (or close to zero). As such, the depth capability of such a hydrophone may then be limited mainly by the volume of its fill fluid reservoir. In one embodiment, for example, to equalize the hydrostatic pressure at a water depth of 3,500 meters, piston 126 may need to displace by approximately 1 mm relative to its position at atmospheric pressure. Piston 126 in one embodiment has 4.5 mm of freedom. Prior art (e.g., non-pressure-balanced) hydrophones would typically be crushed upon exposure to this type of pressure. It should be noted that one possible benefit of the outward facing one of relief valves 120 is to provide the fill fluid with a pathway back to fill fluid reservoir 128 when the hydrostatic pressure is reduced (as may happen in, for example, laboratory testing, field recovery, or depth reduction generally). As noted above, it may be useful for the fill fluid to be relatively stiff; as one of ordinary skill in the art with the benefit of this disclosure will understand, if the bulk modulus of the fill fluid is too low, then the travel distance required of piston 126 may be unrealistically large. Conversely, however, if the bulk modulus is too high, then insufficient sensitivity may result. Accordingly, the selection of a fill fluid with an appropriate bulk modulus (e.g., high enough that that travel distance of piston 126 is realistic, but low enough to give good sensitivity) may be useful for creating a pressure-balanced hydrophone according to this disclosure.

As mentioned previously, the activation pressures of relief valves 120 may advantageously be selected such that the valves cannot be activated below the peak pressure of the acoustic pressure signals of interest. As such, in these embodiments, no open path will generally exist through which the hydrophone's internal pressure could be equalized with a flow of fill fluid that is due to an acoustic pressure that acts on its exterior surface.

Figure 2:
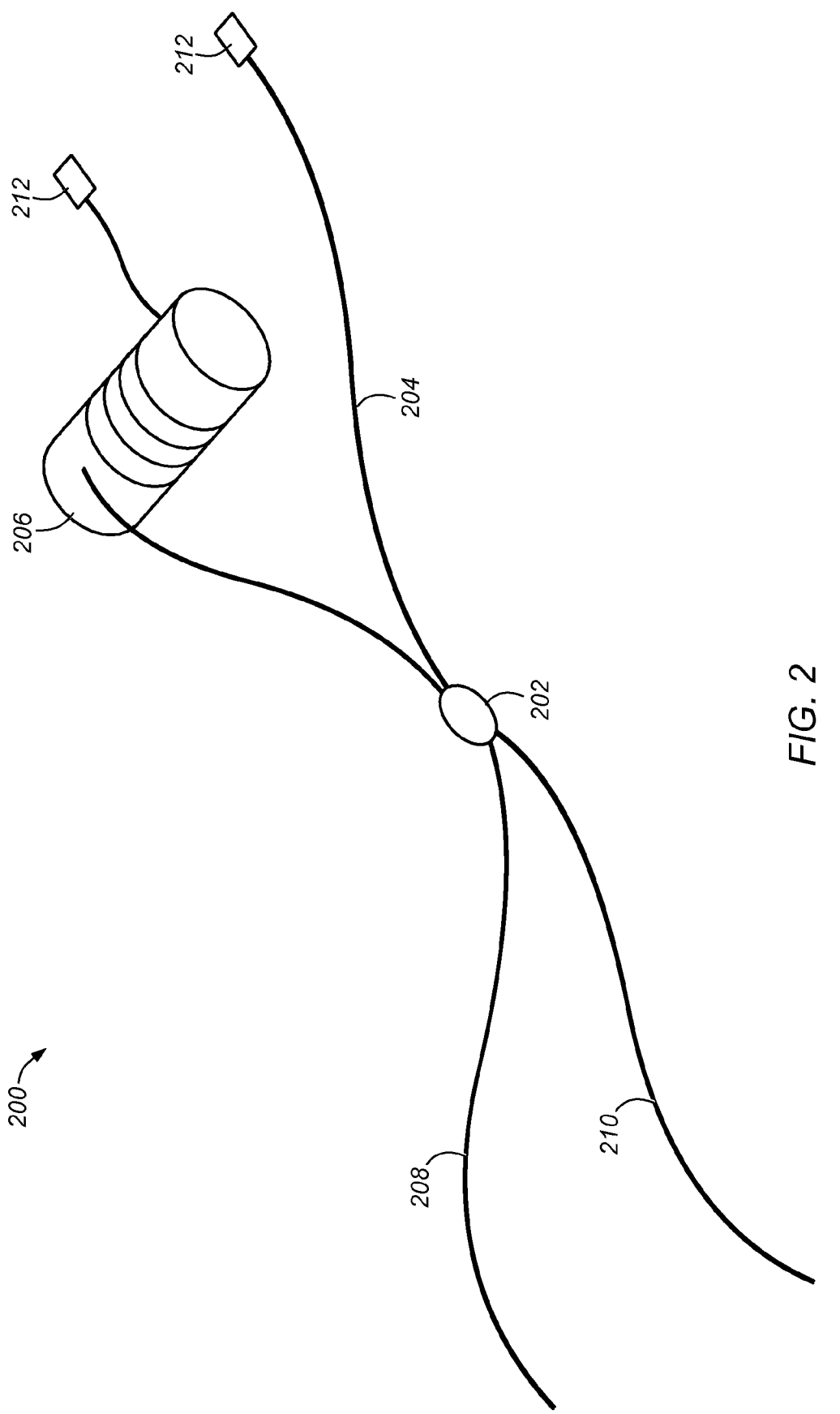
FIG. 2 illustrates an embodiment of a Michelson interferometer according to this disclosure.

As noted above, in some embodiments, devices according to this disclosure may be used in a Michelson interferometric sensor. To aid in understanding, a representation of one embodiment of Michelson interferometer 200 is shown in FIG. 2. Michelson interferometer 200 may include 2×2 optical coupler 202, two legs of which are coupled to two optical paths that may have different optical lengths: reference leg 204 and sensing leg 206. 2×2 optical coupler 202 may also be coupled to light input 208 and light output 210. In one embodiment, all of these optical paths/legs may be created using single-mode optical fiber. In a simple example of an interferometer, each of these optical paths may be terminated with mirrors 212, which may reflect the respective incident light back to the coupler. In some embodiments, Faraday rotator mirrors may be used for this purpose.

As the lengths of reference leg 204 and sensing leg 206 are typically different, the time-of-flight of light in each leg of the interferometer may also be different. If coherent light is used to illuminate this configuration, the two portions of reflected light will typically interfere at the coupler. The interfered light will have a distinct interference pattern, the nature of which will be a function of the mismatch in the two path lengths.

A Michelson interferometric sensor is one in which the path length of one (or sometimes both) of the legs of an interferometer is varied in some way by the property being sensed. As such, the variation of the resultant interferometric pattern may be representative of the variation of the property being sensed. In this example, only the length of sensing leg 206 is varied.

One possible advantage of some embodiments of such a sensor is that the interferometric pattern may appear everywhere along the length of any optical fiber that is spliced to light output 210. As such, completely passive and remote sensing is possible in some embodiments.

Turning now back to FIGS. 1A and 1B, it may be seen that reference optical fiber 112 and sensing optical fiber 114 may serve as the two legs of an optical interferometer (e.g., a Michelson interferometer).

Outer mandrel 104 may be made of a relatively compliant, corrosion-resistant plastic such as Ultem™ 1000™, other polyetherimides, CPVC, various other plastic materials, etc. For example, CPVC has a modulus of elasticity of 2551.1 MPa. Inner mandrel 102 may be made of a relatively stiff, corrosion-resistant metal such as titanium, steel (e.g., Super Duplex Steel), a suitable resin (e.g., a glass-filled polyetherimide such as Ultem™ 2300), etc. For example, titanium has a modulus of elasticity of 1.376e5 MPa, or approximately 54 times the modulus of elasticity of CPVC. End caps 106 and 108 may in some embodiments be fabricated from a relatively stiff, corrosion-resistant metal such as titanium, steel (e.g., Super Duplex Steel), a suitable resin (e.g., a glass-filled polyetherimide such as Ultem™ 2300), etc. Similar remarks to those above also apply with regard to the modulus of elasticity of the end caps.

Hydrophones according to this disclosure may be made into interferometric hydrophones by utilizing the reference and sensing optical fibers accordingly. They may also incorporate various features that may enable them to present higher acoustic pressure sensitivity per unit length of optical fiber. According to some embodiments, some types of optical fiber may be relatively expensive per meter and be used in lengths of around 150 m per hydrophone. Accordingly, one possible design aim may be to achieve an efficient conversion of acoustic pressure into strain within an optical fiber (which is what may cause the interferometric signal) while providing immunity to hydrostatic pressure. Doing so may allow the required length of optical fiber to be minimized for financial efficiency. According to some embodiments, a reduction in required optical fiber length of up to 50% compared to similarly scaled hydrophones built in accordance with prior art may be achieved. According to other embodiments, even more reduction may be achieved. That is, by increasing the sensitivity of a given length of optical fiber, it may be possible to build hydrophones of sufficient sensitivity while using a smaller length of optical fiber.

In the context of piezoelectric hydrophones, it may be the case that responsive stresses both in the longitudinal and hoop directions will contribute directly to a hydrophone's useful output. However, this is typically not the case with fiber optic hydrophones that have optical fiber coiled around the circumference of a mandrel. In fiber optic hydrophones, longitudinal strains may actually reduce their sensitivity, and thus it reducing the longitudinal strains such that volumetric compression of the hydrophones occurs mostly in the circumferential dimension is advantageous.

As noted above, embodiments of the disclosed hydrophones may be described as volumetric composites, where the support of the volumetric load applied by an acoustic pressure is shared between the hydrophone's structural component and its fill fluid. If the structure is designed to have volumetric stiffness that is many times smaller than that of the fill fluid, then the bulk modulus of the fill fluid defines (exclusively or mainly) the structure's overall volume compressibility per unit of applied acoustic pressure.

In one sense, the structural component of the volumetric composite can be simply thought of as a gauge that allows the measurement of the circumference of the enclosed fluid cylinder. In some embodiments, therefore, the hydrophone's internal pressure may be indiscernible from the exterior pressure because if the structure is many times less volumetrically stiff than the fluid, then the structure will offer comparatively little mechanical support. That is to say, the share of the support that the structure will offer to an applied acoustic pressure signal may be zero or near zero.

However, the structure of the hydrophone may still deform in response to the applied acoustic pressure. In a cylindrical embodiment, there are two dimensions that may change to facilitate compliance with the fill fluid's change of volume in response to an applied acoustic pressure: length and circumference.

Accordingly, the comparative moduli in the structure's circumferential and longitudinal directions (that is, the circumferential stiffness vs. the longitudinal stiffness) may determine the relative levels of circumferential vs. longitudinal strain. As the strain in the hydrophone's sensing optical fiber may occur primarily in response to strain of the structure's circumference, it may be advantageous to design the structure to be many times stiffer (or at least not much less stiff) in the longitudinal axis than in the circumferential. In some instances, the structure may be twice as stiff in the longitudinal axis than in the circumferential axis; in other instances, it may be 10 times as stiff, 20 times as stiff, 30 times as stiff, 40 times as stiff, 50 times as stiff, 60 times as stiff, 70 times as stiff, 80 times as stiff, 90 times as stiff, 100 times as stiff, etc., or any range included between such examples. In some embodiments, even a longitudinal stiffness as low as one half the circumferential stiffness may offer significant sensitivity advantages. In yet other embodiments, the longitudinal stiffness may approach the limit of being infinitely more stiff than the circumferential stiffness.

Figure 3:
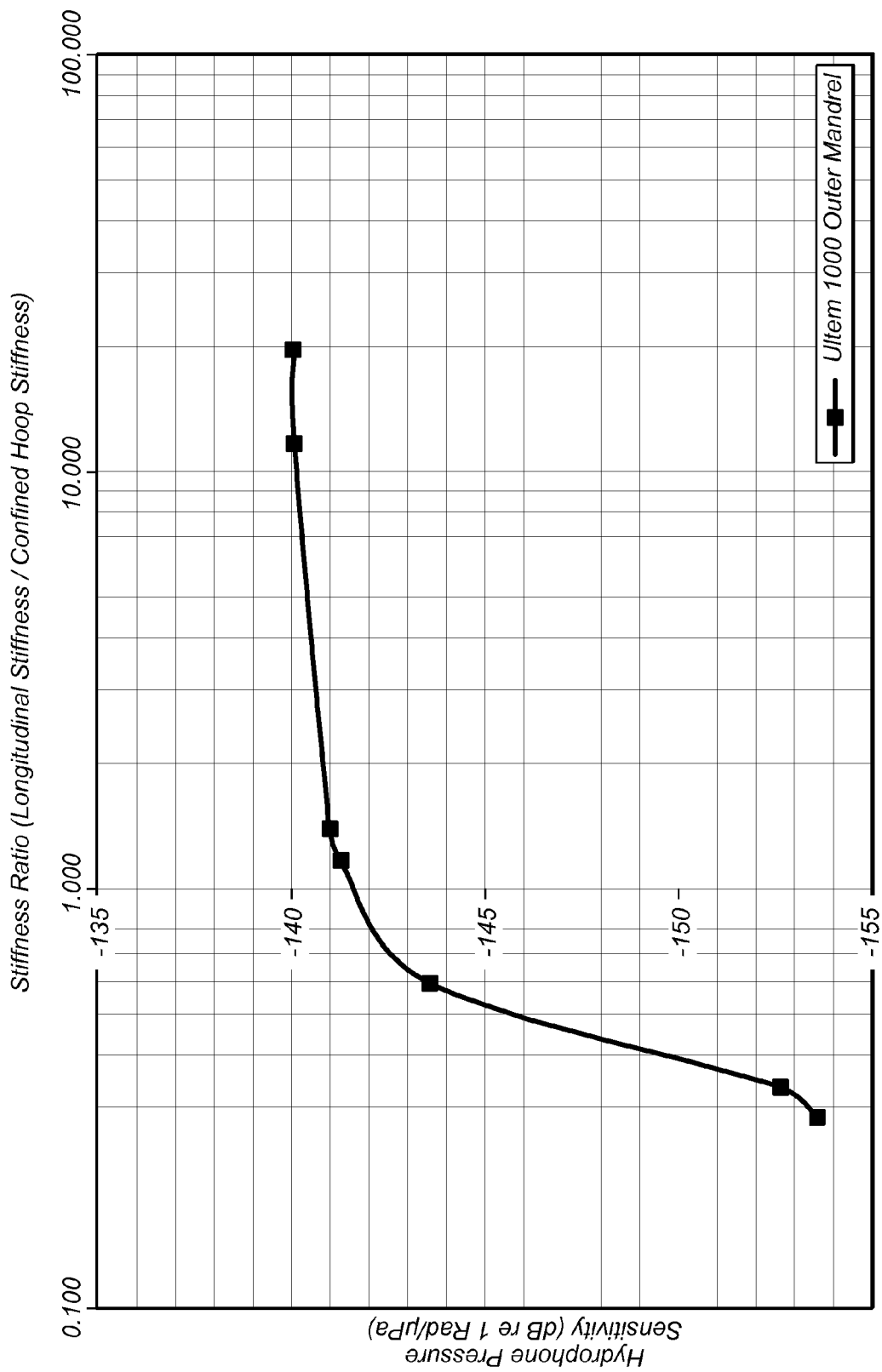
FIG. 3 illustrates a graph of hydrophone sensitivity as a function of stiffness in different dimensions.

Turning now to FIG. 3, a graph is shown which illustrates the effects of changing longitudinal stiffness relative to circumferential stiffness. On the horizontal axis, longitudinal stiffness divided by circumferential stiffness ("stiffness ratio") is shown. On the vertical axis, Hydrophone Pressure Sensitivity is shown. For purposes of this disclosure, hydrophone pressure sensitivity for an interferometric optical hydrophone is typically taken as the output per unit applied pressure. For example, sensitivity may be specified in radians/Pa (or radians/µPa). As can be seen, at a stiffness ratio of approximately 0.2-0.3 (that is, a circumferential stiffness that is only 20-30% as great as the longitudinal stiffness), only relatively low sensitivity is obtained. At a stiffness ratio of 0.5-0.6, significant gains are made. In the range of stiffness ratios from 1 to 20, additional gains are made, but it can be seen that the graph is beginning to become flatter with diminishing returns. By the time a stiffness ratio of 50 has been reached, it is believed that most of the possible gains have been achieved. The graph could in principle be extended arbitrarily or infinitely far to the right, but (without wishing to be limited by theory) it appears that the hydrophone sensitivity approaches an asymptote in the limit of an infinite stiffness ratio. It is contemplated, however, that some embodiments of this disclosure may have a stiffness ratio that may be arbitrarily large. Accordingly, an approximation may in some cases be made that the structure is infinitely stiff in the longitudinal direction and very compliant in the circumferential direction. Along with the assumption that the fill fluid is relatively stiff compared to the circumferential stiffness, this approximation provides a structure which would have the sensitivity dictated by the bulk modulus of the fill fluid, since the structure itself would not offer any resistance to the hydrostatic pressure applied.

The data for the graph of FIG. 3 show how varying the material for the inner mandrel from a highly compliant to a stiff material to show how it affects the sensitivity of the hydrophone, while holding constant the material for the outer mandrel (Ultem™ 1000 is assumed for purposes of FIG. 3, but one of ordinary skill in the art with the benefit of this disclosure will understand generalizations). The data for FIG. 3 are as follows:

TABLE 1

| Inner Mandrel Material | Outer Mandrel Material | Circumferential Stiffness (MPa) | Longitudinal Stiffness (MPa) | Longitudinal/ Circumferential Stiffness Ratio | Sensitivity (dB re 1 Rad/µPa) |
|---|---|---|---|---|---|
| Stainless Steel | Ultem™ 1000 | 6025.21 | 118586.80 | 19.682 | −140.04 |
| Titanium | Ultem™ 1000 | 6025.21 | 70479.00 | 11.697 | −140.08 |
| Ultem™ 2400 | Ultem™ 1000 | 6025.21 | 8390.55 | 1.393 | −140.99 |
| Ultem™ 2300 | Ultem™ 1000 | 6025.21 | 7060.87 | 1.172 | −141.27 |
| Ultem™ 1000 | Ultem™ 1000 | 6025.21 | 3585.00 | 0.595 | −143.56 |
| Modulus 1000 MPa | Ultem™ 1000 | 6025.21 | 2015.50 | 0.335 | −152.65 |
| Modulus 500 MPa | Ultem™ 1000 | 6025.21 | 1711.75 | 0.284 | −153.57 |

Known designs for hydrophones are not believed to take advantage of the effects of longitudinal vs circumferential stiffness. Because the glass in optical fibers is typically very stiff, winding layers of optical fiber around the circumference of a cylinder may tend to make it stiffer in the circumferential axis than in the longitudinal axis. As such, in known hydrophones, the volumetric compression required of fill fluid in response to applied acoustic pressure may be significantly satisfied by longitudinal strain (which may not contribute substantially to strain in the hydrophone's optical fiber) because of lower structural stiffness in this axis. Accordingly, circumferential strain may not be maximized, and therefore sensitivity per unit length of optical fiber will typically be lower in these designs than if the circumferential strain were increased.

Additionally, because it is the fill fluid that in some embodiments determines volumetric compressibility, sensitivity may be increased by increasing the volume of fill fluid contained within a hydrophone's structure. Accordingly, it may be advantageous to use a cylinder with a diameter-to-length ratio equal to 1 (or approximately equal to 1, such as within 5%, within 10%, within 20%, within 50%, within 100%, etc. of a diameter-to-length ratio of 1).

Various embodiments of this disclosure may incorporate some, all, or even none, of the following possible advantages:

1. The volumetric stiffness of the hydrophone structure may be many times lower than the volumetric stiffness of the enclosed fill fluid.

2. A concentric cylinder arrangement may be used, where the outer mandrel is made of a relatively compliant plastic (e.g., a polyetherimide such as Ultem™). The inner mandrel may be thin-walled so as to not use up internal volume that could otherwise be occupied by compressible fill fluid in some embodiments, but may be made of a material that is very stiff compared to the outer mandrel in some embodiments. Accordingly, when end capped, it may make an enclosed structure that is stiffer in its longitudinal axis than it is in its circumferential axis.

3. The flexural stiffness of the assembly's end caps may be made sufficiently high to ensure that flexure due to applied exterior acoustic pressure is negligible compared to the circumferential strain of the assembly's outer mandrel.

4. One of the assembly's rigid end caps may incorporate a pressure-balancing piston and fill fluid reservoir as described above, which may incorporate pressure compensation features.

5. Feed-though points that facilitate connection between the internal volume of the hydrophone and the exterior environment may be made comparatively stiff.

6. Some hydrophones according to this disclosure may be pressure balanced such that the differential stresses/stored energy normally associated with extreme hydrostatic pressure may be reduced or eliminated. Taking this approach may reduce or eliminate the traditional requirement for redundant seals. Some embodiments may include a sensing element and an interferometry circuit mechanically coupled together.

7. Hydrophones according to this disclosure may be fully serviceable and in some aspects may be held together with fasteners instead of structural adhesives.

Figure 4A:
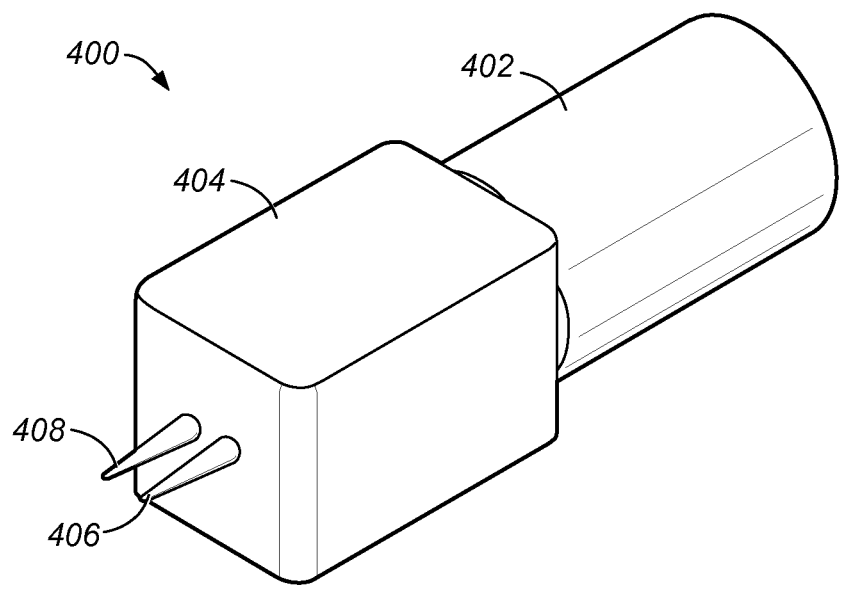
FIGS. 4A-4B illustrate embodiments of arrangements for hydrophones according to this disclosure.
Figure 4B:
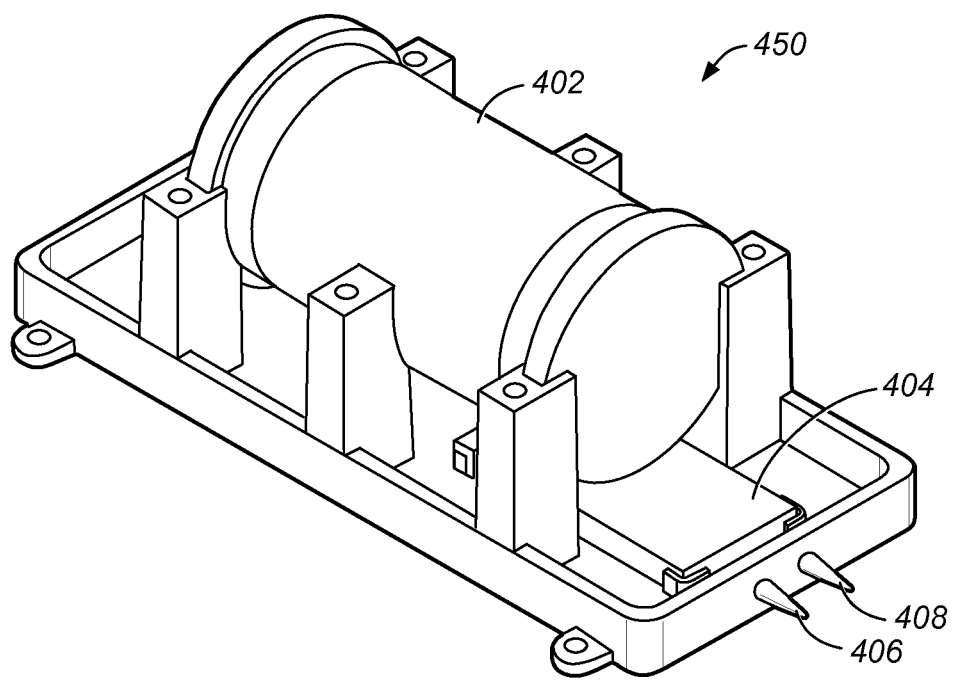

Turning now to FIGS. 4A and 4B, two embodiments of possible arrangements for sensing elements and interferometry circuits are shown. FIG. 4A shows an in-line mounted embodiment of hydrophone 400, and FIG. 4B shows a side-mounted embodiment of hydrophone 450. In FIGS. 4A-4B, sensing elements 402 and interferometry circuits 404 are shown. As shown, input and output fiber grommets 406 and 408, respectively, are also shown. One of ordinary skill in the art with the benefit of this disclosure will understand that various other arrangements are possible within the scope of this disclosure.

Figure 5:
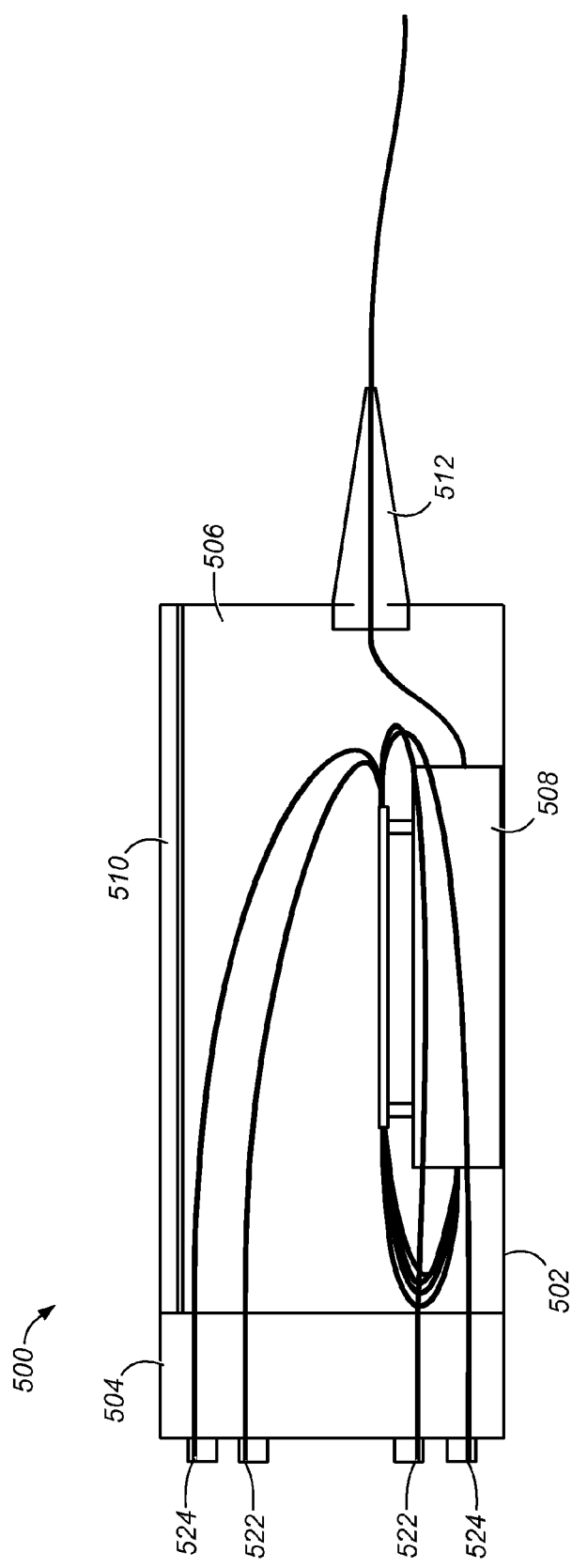
FIG. 5 illustrates an embodiment of an interferometry circuit according to this disclosure.

Turning now to FIG. 5, an example of an embodiment of an interferometry circuit 500 (such as may be used in interferometry circuits 404) that may be used in accordance with this disclosure is shown.

Interferometry circuit 500 may include housing 502, which may further include O-ring sealed lid 510 and may be mechanically attached to the sensing element. The entire sensing element is not shown in FIG. 5, but one end cap 504 is shown to indicate a possible arrangement. Housing 502 may be fabricated from a rigid polymer material such as glass-filled Ultem™ or any other suitable material. It may be advantageous in some embodiments to use a material that has significant stability in seawater.

Lid 510 may in some instances incorporate both a seal screw (not shown) and a flexural feature that facilitates the transference of exterior pressure to the interior of housing 502. Housing 502 may also contain optical circuit 508 (e.g., such as is described above with reference to FIG. 2) that may be encapsulated in an appropriate material (e.g., an encapsulant) for pressure resistance. Reference optical fibers 522 and sensing optical fibers 524 show the location of coupling between interferometry circuit 500 and the attached mandrels.

Interior of housing 502 may in some embodiments be filled with a thermally reversible gel 506 made from a highly extended, high performance thermoplastic rubber (TPR). (A compatible white mineral oil such as ISO 46 oil may in some embodiments be used to extend the TPR.)

One purpose of the gel is to constrain the optical fibers such that the hydrophone does not present spurious acceleration responses. Such gels are typically substantially incompressible, completely self-healing, chemically benign, and thermally reversible. In manufacture, the assembly may be heated to around 60° C., and the heated liquid gel may be poured into the interior of housing 502. The lid may then be secured in place. The assembly may then be placed in a warm oven for a short time, removed and left to cool such that the gel solidifies. Using a syringe, the remaining empty space within the lidded housing may be completely filled with additional extending oil, via the seal screw hole, such that the box is completely or substantially free of air. The seal screw may then be inserted.

Over time, this extending oil may disperse within the gel to create a homogeneous, softer compound that can be removed for service/repair by, for example, simply removing the lid 510 and placing the device, upside down, in an oven, over a suitable receptacle.

Figure 6A:
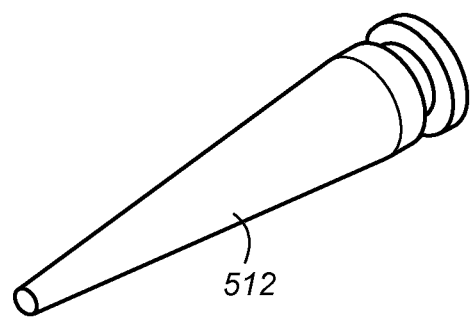
FIGS. 6A-6B illustrate embodiments of fiber grommets according to this disclosure.
Figure 6B:
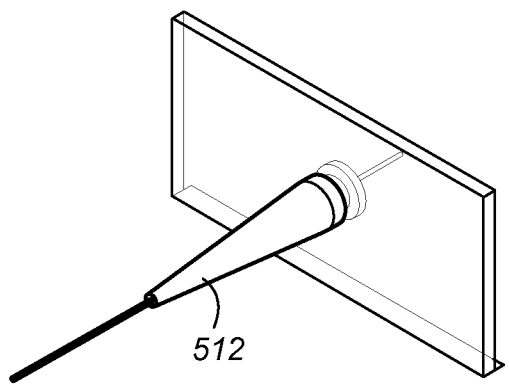

Tight buffered optical fibers may in some embodiments be used to provide an optical connection to the hydrophone. These optical fibers may exit housing 502 via one or more bend-restricting fiber grommets 512 as shown in FIG. 6. These fiber grommets may be fabricated, for example, from a suitably soft grade of fluoroelastomer or hydrogenated nitrile to assure longevity in contact with water. Their dimensions may be selected such that they offer a small amount of compression to all contact surfaces. To prevent free sliding through the fiber grommet, a small length of polyolefin heat shrink sleeve (not shown) may be secured to the optical fiber at its entry and exit points. FIGS. 6A and 6B show close-up views of fiber grommets 512.

Figure 7:
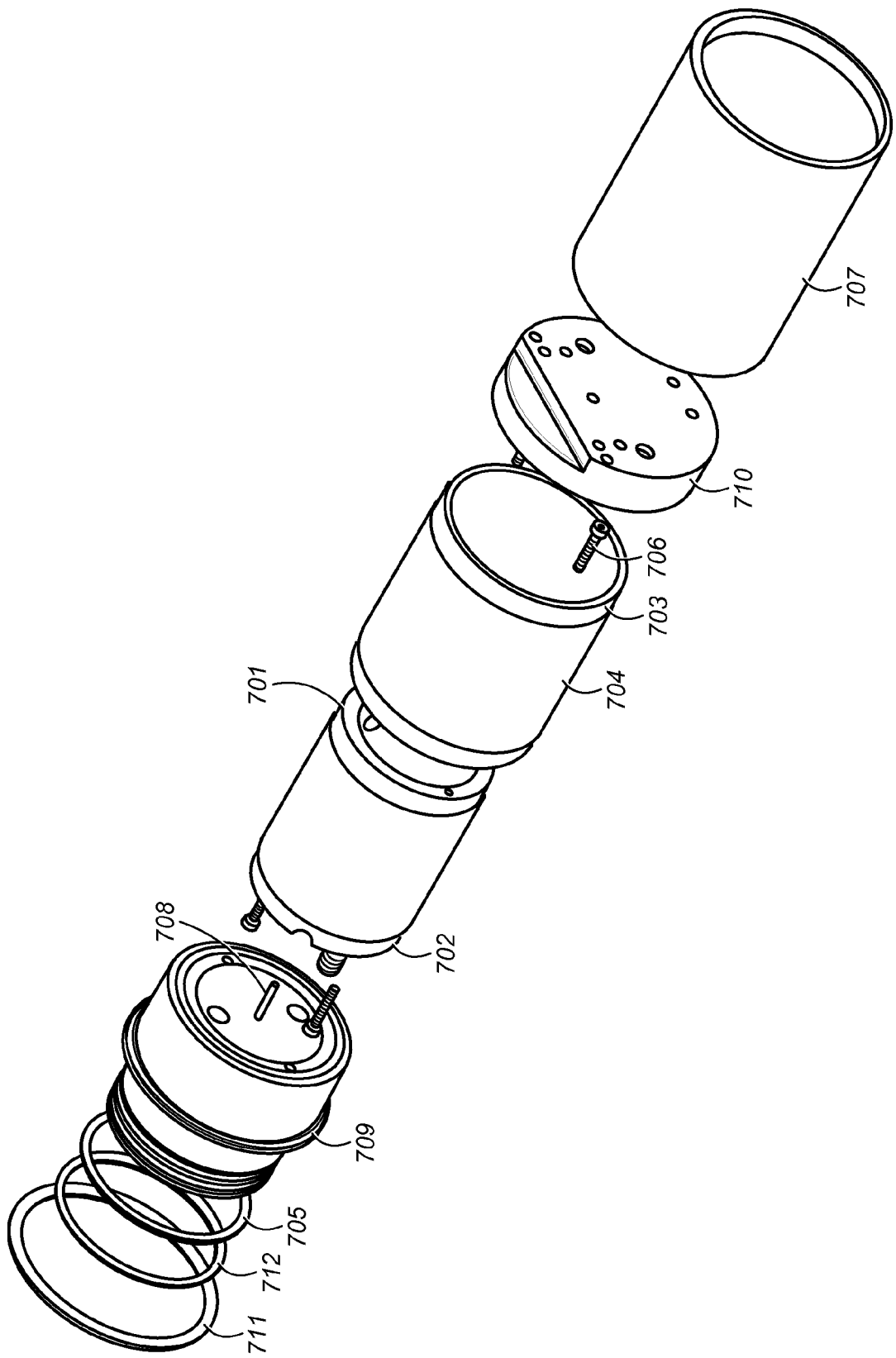
FIG. 7 illustrates an exploded view of an embodiment of a hydrophone according to this disclosure.

Turning now to FIG. 7, an exploded view of one embodiment of a hydrophone is shown. This embodiment includes inner mandrel 701, reference optical fiber 702, outer mandrel 703, sensing optical fiber 704, piston 705, seal screw 706, encapsulant 707, capillary tube 708, end cap 709, end cap 710, larger-inner-diameter O-ring 711, and smaller-inner-diameter O-rings 712.

According to some embodiments, it may be desirable for a hydrophone according to this disclosure to achieve an acoustic pressure sensitivity or scale factor of −146 dB re 1 rad/µPa±1 dB @ 1835 psi. (For purposes of this disclosure, unless otherwise specified, dB measurements should be understood to be relative to 1 radian/µPa.) This sensitivity may be achieved in some embodiments by employing a 2 cm radius sensing coil and employing 47 meters of optical fiber with a coil length of approximately 7 cm. In other embodiments, hydrophones may be constructed with lower, but still useful sensitivity. For example, some hydrophones according to this disclosure may have sensitivities of −158 dB or higher. Some hydrophones according to this disclosure may be used to detect acoustic pressure in the range of −158 dB to −100 dB.

According to some embodiments, it may be desirable for a hydrophone according to this disclosure to have a relatively flat frequency response from ≈0.1 Hz to 200 Hz. The hydrophone's primary resonance may be either (a) sufficiently high as to exist above the −40 dB frequency of a typical air gun cluster or (b) sufficiently damped by its fluid environment to not pose a "rate limit" risk to the optoelectronics given its frequency. The upper limit of the frequency response of hydrophones according to this disclosure may be determined by either their longitudinal or hoop mode resonance.

The lower limit of frequency response may in some cases be determined by the characteristics of the pressure balancing arrangement. One embodiment in which a 0.01" inner diameter×1" long capillary tube is used in conjunction with a 2 cubic inch internal space filled with ISO 450 White (Food Grade) Mineral Oil may achieve the desired lower limit.

According to some embodiments, it may be desirable for the hydrophone to be sufficiently insensitive to acceleration such that at 200 Hz, such that the phase of its interferometric output with respect to the input pressure may deviate by no more than 3° because of the hydrophone's sensitivity to the particle acceleration of the pressure wave being measured.

Cylindrical structures may lend themselves to low-acceleration-sensitivity hydrophone designs because symmetry in the circular plane delivers strain cancellation if the structure is accelerated along a direction within that plane. Such designs may also exhibit low acceleration when excited in the longitudinal direction because the optical fiber is typically wound in the perpendicular plane (i.e., the circular plane) and therefore will not experience any direct strain as a result. Nevertheless, hydrophones according to this disclosure may still have some small but nonzero acceleration response. The optical fiber strains due to accelerations, however, are thought to be very small compared to those created by the primary pressure. As such, the hydrophone may have extremely small acceleration sensitivity.

According to some embodiments, various other operational characteristics may be achieved according to this disclosure. For example, an optical operating wavelength of 1550 nm may be used; a loss difference between interferometric paths of ≤1.3 dB may be achieved; a change in loss over usable pressure×1.5 may be ≤0.2 dB; an allowable loss of 3.8 dB±0.4 dB after 0.5 hour dwell at 1835 psi may be achieved; an optical network mismatch of 70.0 cm±2 cm after 0.5 hour dwell at 1835 psi may be achieved (which may not change with pressure due to the pressure-balanced nature of some embodiments); a design life of 20 years may be possible.

Additionally, some embodiments may be designed to operate at 50 psi to 3,000 psi (e.g., a water depth of 20 meters to 2,000 meters), or even more in some embodiments. It may be advantageous to ensure that the volume of any residual air contained within the hydrophone is sufficiently small to be fully dissolved into the fill fluid at the minimum specified pressure. Some embodiments may have temperature specifications of −20° C. to 60° C. (storage/functionally responsive), 0° C. to 33° C. (use), and ≤80° C. (manufacture). Embodiments may offer 20 years or more of life in continuous exposure to seawater, freshwater, and/or water saturated with an environmentally acceptable antifreeze that ensures liquid state at −20° C. and may be constructed of materials unaffected by temporary contact with common hydrocarbon oils and alcohols. Some embodiments may also advantageously be able to withstand mechanical shocks, such as a 1 meter drop onto a concrete floor, and/or air-to-water thermal shocks such as 35° C.

According to some embodiments, a typical hoop strain of $\Delta L/\Delta P$ in rad/μPa/turn of approximately −1.02e-10 may be achieved. Additionally, with a desired sensitivity of −146 dB in rad/μPa, a total winding length of 61.97 meters may be used in some embodiments.

Figure 8:
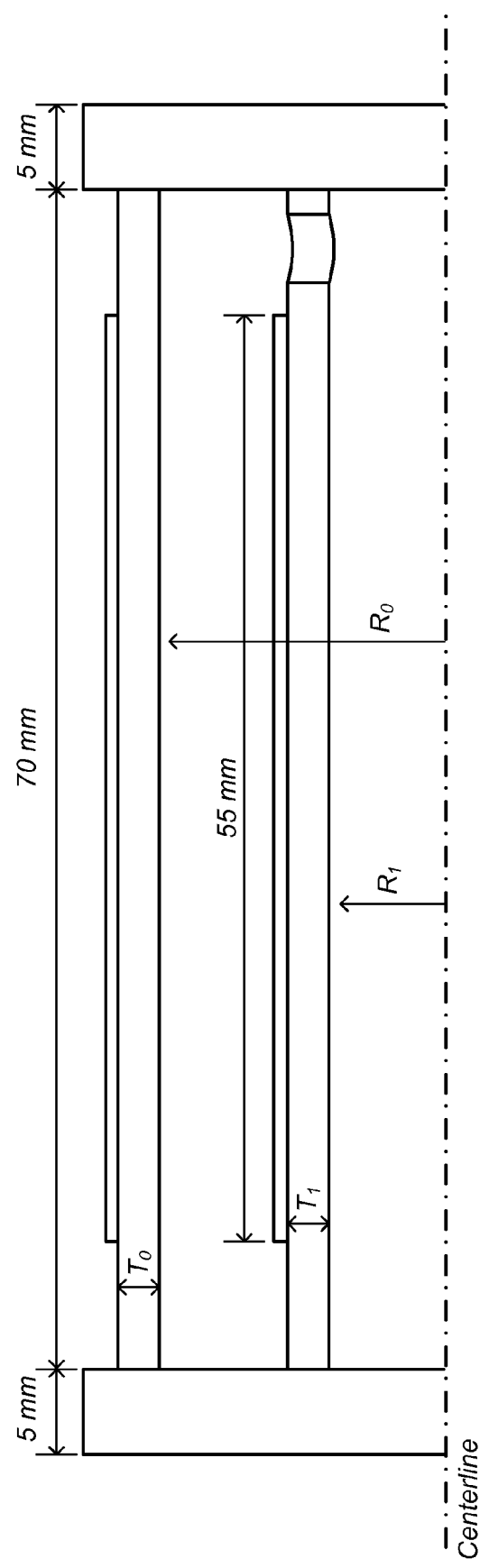
FIG. 8 illustrates an embodiment of a hydrophone according to this disclosure.

Various geometries are possible within the scope of this disclosure. One such geometry is shown in FIG. 8. In this embodiment, two concentric mandrels (for example, two concentric mandrels of 70 mm diameter) are used, with end caps (for example, with end caps of 5 mm height). One end cap may have a small hole to flood the cavities between the two pipes and the space inside the inner pipe with sea water when submerged. The inner pipe may have two holes to allow free movement of water from the outer cavity to inside the pipe. Further, approximately 3 layers of winding around each pipe (e.g., 0.75 mm thick) may be used, as shown. Table 2 shows the hoop strain change per turn per bar pressure and the total winding length as a function of $T_I$, $T_O$, $R_I$, and $R_O$.

TABLE 2

| $T_I$ (mm) | $T_O$ (mm) | $R_I$ (mm) | $R_O$ (mm) | Hoop strain change per turn per bar pressure (m) | Total winding length (m) |
|---|---|---|---|---|---|
| 5.0 | 5.0 | 5.0 | 15.0 | −1.5433e-6 | 67.11 |
| 5.0 | 2.5 | 5.0 | 17.5 | −1.7526e-6 | 59.09 |
| 2.5 | 2.5 | 7.5 | 17.5 | −1.9025e-6 | 54.44 |
| 2.5 | 2.5 | 5.0 | 17.5 | −1.9467e-6 | 53.21 |

As noted above, in some embodiments, accelerations applied to a hydrophone of this disclosure may produce relatively small strains in the optical fiber windings. For example, in one embodiment, a sinusoidal acceleration of 1 mm/s$^2$ in the radial direction may produce a strain of approximately 2.5e-12, as opposed to a strain of 1.589e-5 produced by a dynamic pressure of 1 bar. A similar acceleration in the longitudinal direction may produce a strain of only approximately 3.75e-15. Accordingly, some structures according to this disclosure may be seen to be relatively insensitive to accelerations.

According to some embodiments of this disclosure, a hydrophone may include: means for establishing a longitudinal stiffness; means for establishing a circumferential stiffness; reference means for measuring a reference signal; and sensing means for measuring a variable signal; wherein the longitudinal stiffness is greater than or equal to one half of the circumferential stiffness. Various examples of each of these means have been described herein. For example, the means for establishing a longitudinal stiffness may be a stiff mandrel, an inner mandrel, a stiff mandrel and stiff end caps, etc. The means for establishing a circumferential stiffness may be a compliant mandrel, an outer mandrel, etc. The reference means may be an optical fiber, an optical fiber wound around a mandrel, etc. The sensing means may be an optical fiber, an optical fiber wound around a mandrel, etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a hydrophone that includes an outer mandrel having a first wall thickness, and an inner mandrel having a second, greater wall thickness;
    wherein the hydrophone has a longitudinal modulus of elasticity in a longitudinal dimension based at least in part on the second wall thickness of the inner mandrel and a circumferential modulus of elasticity in a circumferential dimension based at least in part on the first wall thickness of the outer mandrel;
    wherein the longitudinal modulus of elasticity is greater than the circumferential modulus of elasticity and less than 20 times the circumferential modulus of elasticity.

2. The apparatus of claim 1, wherein the hydrophone is a fiber optic hydrophone.

3. The apparatus of claim 2, wherein the hydrophone includes a reference optical fiber disposed about the inner mandrel and a sensing optical fiber disposed about the outer mandrel.

4. The apparatus of claim 3, wherein the hydrophone further includes a fill fluid disposed within an internal volume thereof, and wherein a bulk modulus of the fill fluid is between 5 times to 20 times the circumferential modulus of elasticity.

5. The apparatus of claim 4, further comprising end caps disposed at opposite longitudinal ends of the hydrophone, wherein the end caps and the inner mandrel are made of a same material.

6. The apparatus of claim 5, wherein the same material comprises at least one material selected from the group consisting of: steel, titanium, glass-filled polyetherimide, and any combination thereof.

7. A hydrophone, comprising:
    first and second end caps disposed at opposite longitudinal ends of the hydrophone;
    an inner mandrel coupled to the first and second end caps and having a second wall thickness, wherein a reference optical fiber cable is wound around the inner mandrel; and
    an outer mandrel coupled to the first and second end caps, having a first wall thickness, and disposed outside the inner mandrel, wherein a sensing optical fiber cable is wound around the outer mandrel;
    wherein the hydrophone has a longitudinal modulus of elasticity in a longitudinal dimension based at least in part on the second wall thickness of the inner mandrel and a circumferential modulus of elasticity in a circumferential dimension based at least in part on the first wall thickness of the outer mandrel, and wherein the longitudinal modulus of elasticity is greater than the circumferential modulus of elasticity.

8. The hydrophone of claim 7, further comprising a piston disposed within the first end cap.

9. The hydrophone of claim 8, further comprising:
    a fill fluid reservoir disposed within the first end cap; and
    a capillary tube coupled between the fill fluid reservoir and an internal volume of the hydrophone.

10. The hydrophone of claim 7, wherein the hydrophone has a relatively flat frequency response from 0.1 Hz to 200 Hz.

11. The hydrophone of claim 7, further comprising a fill fluid disposed within the hydrophone, and wherein a bulk modulus of the fill fluid is between 5 times to 20 times the circumferential modulus of elasticity.

12. A hydrophone, comprising:
    first and second end caps disposed at opposite longitudinal ends of the hydrophone, wherein the first and second end caps are made from a material selected from the group consisting of steel, titanium, and glass-filled polyetherimide;
    an inner mandrel coupled to the first and second end caps, wherein the inner mandrel is made from a material selected from the group consisting of steel, titanium, and glass-filled polyetherimide; and
    an outer mandrel coupled to the first and second end caps and disposed outside the inner mandrel, wherein the outer mandrel is made from a material selected from the group consisting of polyetherimide, CPVC, and plastic;
    wherein the hydrophone has a longitudinal modulus of elasticity in a longitudinal dimension based at least in part on the inner mandrel, and a circumferential modulus of elasticity in a circumferential direction based at least in part on the outer mandrel; and
    wherein the longitudinal modulus of elasticity is larger than the circumferential modulus of elasticity.

13. The hydrophone of claim 12, wherein the hydrophone is a fiber optic hydrophone.

14. The hydrophone of claim 12, wherein the hydrophone has a sensitivity of at least −146 dB re 1 rad/μPa.

15. The hydrophone of claim 12, further comprising a fill fluid within the hydrophone, wherein a bulk modulus of the fill fluid is between 5 times to 20 times the circumferential modulus of elasticity.

16. A method comprising:
    disposing a hydrophone in a vicinity of a formation, wherein the hydrophone includes:
        first and second end caps disposed at opposite longitudinal ends of the hydrophone;
        an inner mandrel coupled to the first and second end caps, wherein a reference optical fiber cable is wound around the inner mandrel; and
        an outer mandrel coupled to the first and second end caps and disposed outside the inner mandrel, wherein a sensing optical fiber cable is wound around the outer mandrel;
        wherein the outer mandrel has a first wall thickness, and the inner mandrel has a second wall thickness;
        wherein the hydrophone has a longitudinal modulus of elasticity in a longitudinal dimension based at least in part on the second wall thickness of the inner mandrel and a circumferential modulus of elasticity in a circumferential dimension based at least in part on the first wall thickness of the outer mandrel, and wherein the longitudinal modulus of elasticity is greater than the circumferential modulus of elasticity; and
    detecting seismic energy reflected from the formation with the hydrophone.

17. The method of claim 16, further comprising using the detected seismic energy in at least one operation selected from the group consisting of: a marine geophysical survey, a seafloor reservoir monitoring, and a downhole acoustic monitoring.

18. The method of claim 16, wherein the disposing the hydrophone in the vicinity of the formation comprises locating the hydrophone at a water depth of between 100 meters and 3,500 meters.

19. The method of claim 16, wherein the hydrophone has a sensitivity of at least −146 dB re 1 rad/μPa.

20. The method of claim 16, wherein a phase of an interferometric output of the hydrophone is within 3° of a phase of the seismic energy.

21. The method of claim 16, wherein the hydrophone is at a temperature between 0° C. and 33° C.

22. The method of claim 16, further comprising a fill fluid within the hydrophone, wherein a bulk modulus of the fill fluid is between 5 times to 20 times the circumferential modulus of elasticity.

* * * * *